(12) United States Patent
Mitchell et al.

(10) Patent No.: US 12,089,691 B2
(45) Date of Patent: *Sep. 17, 2024

(54) 3D PRINTED STRUCTURE

(71) Applicant: ECCO SKO A/S, Bredebro (DK)

(72) Inventors: Joseph Henry Mitchell, Sawbridgeworth (GB); Patrizio Carlucci, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 553 days.

This patent is subject to a terminal disclaimer.

(21) Appl. No.: 17/295,407

(22) PCT Filed: Nov. 20, 2019

(86) PCT No.: PCT/EP2019/081886
§ 371 (c)(1),
(2) Date: May 19, 2021

(87) PCT Pub. No.: WO2020/104505
PCT Pub. Date: May 28, 2020

(65) Prior Publication Data
US 2022/0007785 A1 Jan. 13, 2022

(30) Foreign Application Priority Data
Nov. 20, 2018 (EP) .................. 18207209

(51) Int. Cl.
*B29C 64/118* (2017.01)
*A43B 13/04* (2006.01)
(Continued)

(52) U.S. Cl.
CPC ............ *A43B 13/181* (2013.01); *A43B 13/04* (2013.01); *A43B 13/125* (2013.01);
(Continued)

(58) Field of Classification Search
CPC ....... A43B 13/04; A43B 13/125; A43B 13/14; A43B 13/181; A43B 13/187;
(Continued)

(56) References Cited

U.S. PATENT DOCUMENTS

| 2014/0068880 A1 | 3/2014 | Torrance et al. |
| 2015/0013066 A1 | 1/2015 | Foubister et al. |

(Continued)

FOREIGN PATENT DOCUMENTS

| CN | 104859260 A | 8/2015 |
| CN | 105034361 A | 11/2015 |

(Continued)

OTHER PUBLICATIONS

Extended European Search Report from the European Patent Office for European Application No. 18207209.0, mailed May 31, 2019 (11 pages).

(Continued)

*Primary Examiner* — Lawrence D Ferguson
(74) *Attorney, Agent, or Firm* — Lee & Hayes, P.C.

(57) ABSTRACT

A 3D printed structure of an elastic material may be provided. In one implementation, the 3D printed structure may include at least a first wall having a plurality of layers extending along a first axis. The first wall may include at least a primary structural layer, a first flexible layer, and a second flexible layer. The primary structural layer may have a first rigidity and at least one of the first flexible layer or the second flexible layer may have a second rigidity, the first rigidity being greater than the second rigidity.

18 Claims, 4 Drawing Sheets

(51) Int. Cl.
  *A43B 13/12*   (2006.01)
  *A43B 13/18*   (2006.01)
  B33Y 80/00 (2015.01)
  *B29K 83/00*   (2006.01)
  *B29L 31/50*   (2006.01)

(52) U.S. Cl.
  CPC ............ *A43B 13/187* (2013.01); *B33Y 80/00* (2014.12); *B29C 64/118* (2017.08); *B29K 2083/00* (2013.01); *B29L 2031/504* (2013.01)

(58) Field of Classification Search
  CPC ... B29C 64/118; B29C 64/106; B29C 64/336; B29D 99/0089; B29D 35/122; B29D 35/142; B29K 2083/00; B29K 2105/046; B29L 2031/504; B29L 2031/58; B29L 2031/608; B29L 2031/751; B33Y 80/00; B33Y 10/00; B33Y 70/00
  See application file for complete search history.

(56) References Cited

U.S. PATENT DOCUMENTS

| | | |
|---|---|---|
| 2017/0127477 A1 | 5/2017 | Sandiford |
| 2017/0210074 A1 | 7/2017 | Ueda |
| 2020/0229538 A1 | 7/2020 | Yoshinaga |

FOREIGN PATENT DOCUMENTS

| | | |
|---|---|---|
| CN | 107301671 A | 10/2017 |
| EP | 3213909 A1 | 9/2017 |
| JP | 2017177594 A | 10/2017 |

OTHER PUBLICATIONS

International Search Report and Written Opinion of the International Searching Authority from the European Patent Office for International Application No. PCT/EP2019/081886, mailed Feb. 18, 2020 (13 pages).

Schneider-Affeld et al., "Dow Silicones in 3D-Printed Midsole Cores by ECCO," Dow Chemical Co. (Apr. 4, 2018), https://corporate.dow.com/en-us/news/press-releases/dow-silicones-in-3d-printed-midsole-cores-by-ecco (retrieved by International Searching Authority on May 21, 2019) (3 pages).

Japan Notification of Reasons for Rejection for corresponding Japanese Patent Application No. 2021-526811 dated Sep. 12, 2023, 8 pages.

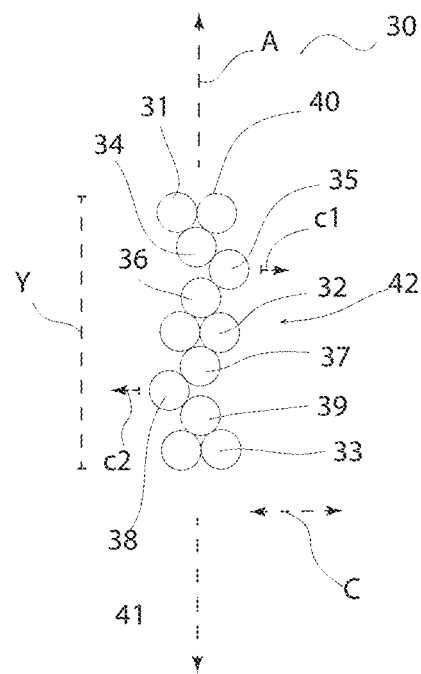
Fig. 2c
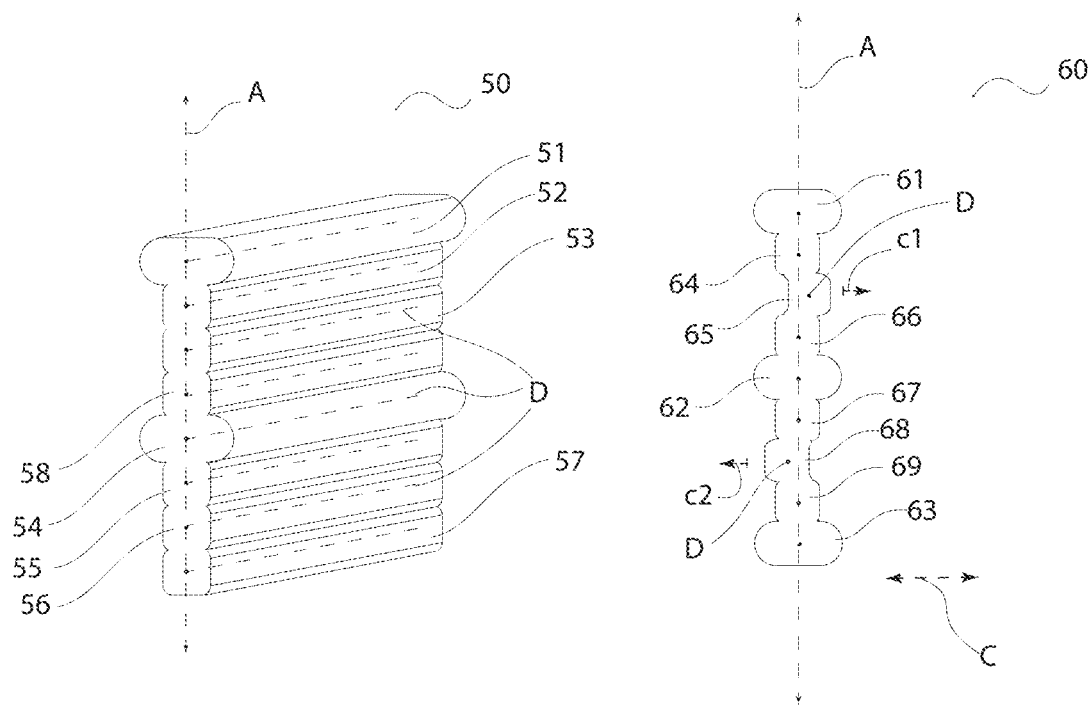
Fig. 3
Fig. 4

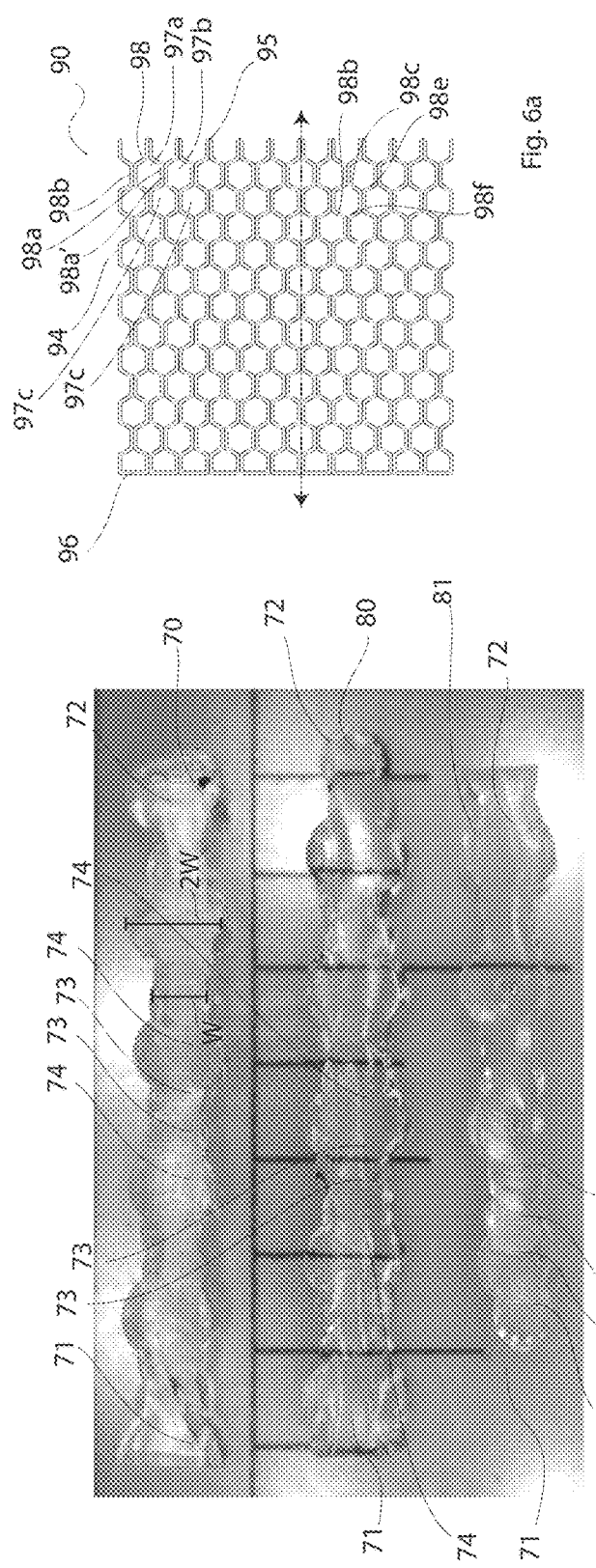
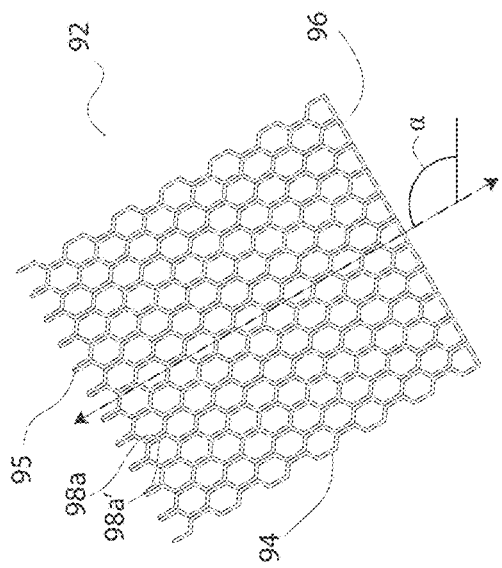
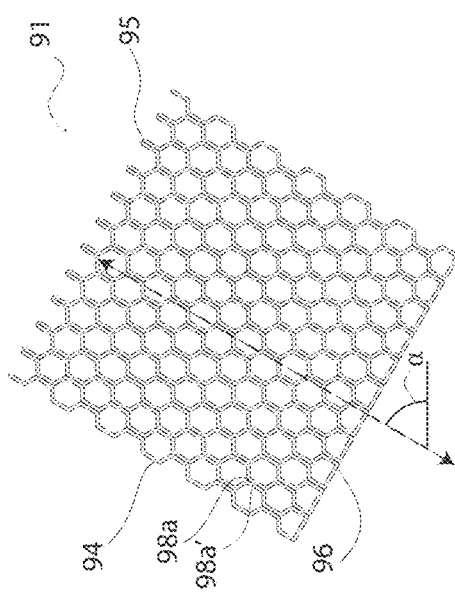

3D PRINTED STRUCTURE

CROSS-REFERENCE TO RELATED PATENT APPLICATIONS

This application is a U.S. national stage entry under 35 U.S.C. § 371 of International Application No. PCT/EP2019/081886, filed Nov. 20, 2019, which claims the benefit of European Patent Application No. 18207209.0, filed Nov. 20, 2018, both of which are hereby incorporated by reference in their entireties.

TECHNICAL FIELD

A 3D printed structure of an elastic material, the 3D printed structure comprising: at least a first wall having a plurality of layers extending along a first axis, the first wall comprising at least a primary structural layer and a first flexible layer and a second flexible layer,

BACKGROUND

A common issue with 3D printed structures is that such kinds of structures are often made out of a relatively stiff material, which means that the structure of the 3D printed structure may be relatively inflexible due to the composition of the material that is used for printing.

CN 105034361 discloses a honeycomb core containing cells of different thicknesses and different shapes, and at least part of the wall thickness of the obtained honeycomb unit is gradually increased in the direction along the center of the honeycomb unit toward both ends of the honeycomb unit, so that the honeycomb clamp can be added. The contact area of the core and the panel, and the honeycomb core can be a flat or curved structure to meet the requirements of the nonlinear curved structure, where the honeycomb core has an excellent bending and compression resistance.

EP 3 213 909 discloses an impact resistant sandwich structure architecture for high speed impact resistant structure, comprising sandwich skins which enclose a sandwich core formed by a plurality of spacing layers and a plurality of trigger layers, wherein these layers are stacked alternatively in the core.

These types of material are widely used for providing stiffening in the aerospace industry, where these materials are intended to maintain their shape during application of an external force.

However, in order to attempt to get structures that have a compressibility and flexibility, there have been made numerous attempts to construct a material that has the desired flexibility while still maintaining the structural integrity of the material. Due to the flexibility and the weight of the material used for printing it may be a difficult task to create a layered construction that can achieve a controlled flexibility and counterforce within multiple different and very specific areas. Further difficulties may arise when there are multiple areas in the 3D printed structure that need to have differing flexibility or counterforce.

Such flexible layers have often been made using a foam like substance, such as a PU foam, where the foam can maintain a certain form while still having a certain flexibility, such as cushions for seats, midsoles for shoes, padding for luggage, etc. One issue with this kind of flexible layers is that the flexibility of the layers reduces when the structural strength of the materials is increased, where this also increases the weight of the material. Furthermore, the formation of this kind of material is often done in large molds, where any individualization of the material, such as specialized contouring often requires material to be cut away, and the foam to be sculpted after manufacturing, as the cost of an individualized mold is too high for it to be a viable option for personal individualization for each user.

Thus, there is a need to for improved structures for individualization of flexible structures.

General Description

In accordance with the present description, there is provided a 3D printed structure of an elastic material, the 3D printed structure comprising: at least a first wall configured to deform when a force is applied to the wall in a direction of a first axis and configured to return to its original form when the applied force is released, where the wall has a plurality of layers extending along the first axis, the first wall comprising at least a primary structural layer and a first flexible layer and a second flexible layer, where the primary structural layer has a first rigidity and the first flexible and/or the second flexible layer has a second rigidity, where the first rigidity is larger than the second rigidity.

Within the context of the present description, the term rigidity may be understood as a rate of flexibility, where the measurement may be made of a stiffness of a layer, a rate of yield, hardness (i.e. in the understanding when a harder layer has a higher rate of rigidity than a softer layer). The rigidity of a certain layer should be understood as the capability, aptitude or ability of a layer to flex in a certain direction. An alternative representation of the rigidity, may e.g. be the flexibility of the layers, where the primary structural layer (or any subsequent structural layer) may have a first flexibility, and the first and/or the second flexible layer (or any subsequent flexible layer) may have a second flexibility, where the first flexibility may be lower than the second flexibility. The rigidity may be seen as a quantification of the extent of how the layer resists in deformation in response to an applied force. The term flexible may be a complementary concept to the rigidity, i.e. the more flexible the layer is the less rigid it is.

Within the understanding of the present disclosure the term "layer" may be understood as a two-dimensional plane of a three-dimensional structure. The layer may comprise one or more walls that intersect the two-dimensional plane. Within the understanding of the present disclosure a "wall" may be understood as a two-dimensional plane of a three-dimensional structure, where the two-dimensional plane may be parallel to the wall and may intersect a plurality of layers of the three-dimensional structure. Within the understanding of the present disclosure a first layer of a wall may abut a second layer of a wall, which may abut a third layer in a wall. Thus, a wall may be seen as a structure having two or more layers stacked on top of each other, or stacked below each other.

The term "structural layer" is intended to differentiate from other layers in the wall structure, and where the term "flexible layer" is intended for naming of layers that are not seen as the structural layer, in order to differentiate the structural layer from different layers in the wall structure, i.e. the flexible layers. The presence of a structural layer and at least one flexible layer in a wall structure does not exclude other types of layers in the wall structure, having different properties than the two layers that are defined as being structural and/or flexible layers.

The primary structural layer, the secondary structural layer, the tertiary structural layer or any other structural layer may have a first rigidity. All the structural layers may have a first rigidity, where the first rigidity is higher than the second rigidity. The first flexible layer, the second flexible layer, the third flexible layer and/or any other subsequent flexible layer may have a second flexibility, where the second flexibility may be lower than the first flexibility.

In one embodiment, all structural layers in one wall and/or more walls may have the same flexibility. In one embodiment all flexible layers in one wall and/or more walls may have the same flexibility.

The provision of a first wall being provided in an elastic material, means that when a force is applied to the wall in a direction of the first axis, the wall is capable of absorbing the force, causing the wall to collapse. The force may be seen as being a compressive force, where the force up to a predetermined level may cause the first wall to compress without the wall being deformed away from the first axis. I.e. the wall may maintain its shape up to a certain amount of force. However, when a predetermined threshold of force is a surpassed, i.e. where a force higher than the threshold is applied to the wall, the wall may deform out of shape, so that one or more layers of the wall may translate in a direction that is different from the direction of the first axis, i.e. in a direction that may e.g. seen as being orthogonal to the first axis. Thus, the wall may be seen as being bent, or bulge away from the first axis, where the force applied to the first wall is absorbed in the wall structure due to the elasticity of the elastic material, so that when the force is released/removed from the first wall, the first wall will return to its original shape. I.e. the elastic material will provide a resilient wall structure, where the wall will return to its original form after being compressed. Thus, the first wall, or any subsequent wall may be seen as being resilient. The wall may be seen as having an uncompressed state, a compressed state, and an intermediate state which may be seen as a state of the wall where a compressive force is applied to the wall, but where the wall has not reached its fully compressive state.

The wall may have a first end which may be seen as the top part of the wall, and a second end, which may be seen as the bottom part of the wall, where the wall is provided with a plurality of layers between the first end and the second end. When there is no compressive force applied to the wall, the wall may have a first length where the first length is substantially the summation of the height of each layer of the wall. When a compressive force is applied to the wall in a direction that is parallel to the first axis the wall may have a second height, where the second height is lower than the summation of the height of each layer.

This means that the wall of the 3D printed structure may have areas in the direction of the first axis that have higher rigidity than other areas, that are positioned in other positions along the first axis. The higher rigidity allows the primary structural layer, or any other structural layer of the first wall, to be less likely to be deformed than the flexible layer which has a reduced rigidity, compared to the structural layer. This therefore means that when a compressive force (in the direction of the first axis) is applied to the wall, where the compressive force is above a predefined force, the compressive force applied to the layers will compress the wall, where the wall will have a predisposition to give in to the compression force, where the wall is allowed to buckle or bend due to the compressive force. Due to the difference in rigidity of the different layers, the compressive force will cause the layer having less rigidity to yield prior to the layer having increased rigidity, meaning that the bend and/or buckling of the wall will occur in predefined areas, where the layers having less rigidity will deflect away from the first axis, before the layers having the increased rigidity.

The rigidity and the number of layers may be adjusted in accordance with the requirements of the 3D printed structure, where the number of flexible layers may be increased for a wall having a lower requirement of force required for allowing the first wall to yield, while an increased number of structural layers may be applied in order to improve the resistance to the compressive force. Thus, by the change of the ratio of flexible layers vs. structural layers, it is possible to alter the rigidity of the first wall.

In one exemplary embodiment of the present disclosure the 3D printed structure may be a 3D printed flexible structure. The 3D printed structure may be a structure which may be seen as shock absorbing, where the 3D printed structure is configured to absorb a force that is applied to the 3D printed structure. The shock absorption may be provided in the form that the 3D printed structure absorbs an energy of a force applied to the 3D printed structure, where the 3D printed structure may elastically deform to absorb the energy. When the force is released the energy may be released when the elastic deformation is reversed.

The 3D printer structure, and the walls of the 3D printed structure may have an original shape, which may be understood as their permanent shape, and a deformed shape, which may be seen as a temporary shape, where the deformed shape may be seen as a shape created by an external stimulus such as an external force or an external application of mechanical energy to the 3D printed structure and/or parts of the 3D printed structure.

In one embodiment of the present invention the 3D printed structure may be a 3D printed structure adapted to absorb a force generated by a human body. The 3D printed structure may be used as a dampening structure between a part of a human body and another entity, i.e. a rigid structure, such as part of a sole assembly in a shoe, a sitting area on a seat, a pad between a rucksack and the body of a user, a mattress, and similar structures that may be used to absorb and distribute energy transferred from a human body to another entity.

Within the understanding of the present invention the term "elastic material" should be understood as a term meaning that the elastic material is capable of stretching, or compressing without plastic deformation. I.e. where the elastic region of a stress-strain curve is larger than the plastic region of the stress strain curve. I.e. the Young's modulus of the material may be less than 60 GPa, or preferably less than 40 GPa, or less than 20 GPa, or less than 10 GPa.

The term "elastic material" may mean a material that has at least a 50% elongation, or specifically more than 100% elongation, or specifically more than 200% elongation, or specifically more than 300% elongation. The term percent elongation (elongation %) is a measurement that captures the amount a material will plastically and elastically deform up to fracture. Percent elongation is one way to measure and quantify the ductility of a material. The material's final length is compared with its original length to determine the percent elongation and the material's ductility.

The elastic material used for the provision of the layers may be a material that has a Shore A hardness of between 30 and 80. The 3D structure however, may have a combined lower Shore A hardness than the elastic material, as the material may be made of a number of walls of layered material that may be separated from each other. Thus, the hardness of the structure may be a combination of the hardness of the walled structures and the spacing between the walls. Furthermore, due to the yield ability of the walls, the wall may deflect or bend at rates that are lower than at a hardness of the elastic material. Hence, the individual layers may be stable in the direction of compression force, where the layers compress minimally on an individual basis at the force which they are subjected to.

The order of the structural layer and the first flexible layer and the second flexible layer may be the primary structural layer followed by the first and the second flexible layers, seen in the direction of the first axis. The order may also or alternatively be a first flexible layer followed by the primary structural layer, which in turn is followed by the second flexible layer. The order may also or alternatively be the first flexible layer, followed by the second flexible layer followed by the primary structural layer.

This means that when a force is applied in a direction parallel to the longitudinal axis the first and/or second flexible layers will deflect away from the longitudinal axis before the primary structural layer will deflect away from the longitudinal axis.

A wall having a structure of layers having identical layers along its entire length may have a somewhat predictable collapsing force, when a compressive force is applied to the wall in its longitudinal direction, but it may be nearly impossible to predict how the wall will collapse, as the collapse may be the direction of the force, when the force is not completely parallel to the longitudinal axis, that has a huge impact on how the wall may collapse or bend. Furthermore, another issue is that when the wall collapses, it may lose most of or all of its counterforce to the compressive force, so that the wall loses most of its opposing force as soon as it collapses, as it may fold and/or collapse completely.

However, by applying a structure of structural layers and flexible layers, that may e.g. be in a repeating structure along the longitudinal axis it is possible to predict where the first wall will give in to the compressive force, as the flexible layer may have a reduced stiffness and/or resistance to the force, so that the wall will in all likelihood deflect in the areas having the flexible layers, before it will deflect in the areas having the structural layers. Thus, it may be possible to have the wall collapse/deflect to the compressive force in a predictable way, which makes it easier to configure the wall to collapse at a certain force. Furthermore, this allows the wall to collapse or deflect in a controlled manner, so that the counterforce to the compressive force may be maintained by the structural parts of the wall, even though the flexible parts have deflected or have collapsed between the structural parts.

The first wall may be a part of a larger structure, where each layer of the wall may correspond to a layer of a larger 3D structure, and where the larger 3D structure may have a plurality of layers. The first wall may be part of a structure having a second wall, a third wall, or subsequent walls. The first wall may be part of a structure, where the first wall is a part of a cellular structure, where the first wall is part of a closed cell (seen from above), such as a circular, annular, triangular, hexagonal, or any suitable polygonal closed cell, where the first wall and/or a plurality of walls define the volume of a cell.

The structural layer may be any kind of structure that creates a wall having an increased rigidity compared to the flexible layers. The structural layer may comprise a plurality of layers in the direction of the first axis, where the layers may be stacked on top of each other, creating a part of a wall having an increased rigidity. The structural layer may have a height in the direction of the first axis that is similar or the same as the height of a first layer. However, the structural layer may alternatively have a height that is larger than the height of the flexible layer.

Within the context of the present disclosure the term wall may be replaced with the term wall part, when disclosing a part of the wall.

Thus, the walls and the structural layers may be utilized as a mechanical device which may be used to store energy and subsequently release it to absorb shock or to maintain a force between contacting surfaces (first end and second end of a wall).

In one or more embodiments the primary structural layer and/or the first and/or the second flexible layers may be attached to another layer via a boundary, where the boundary between the two layers may have a rigidity that is less than the rigidity of the primary structural layer and/or the flexible layer. This means that when the first wall deflects from the first axis, the deflection of the two layers may pivot across the boundary (seen in a cross-sectional view). This means that the layers may deflect in a predefined area, which means that the deflection of the first wall may be predicted and/or anticipated, which may assist in controlling the deflection by adjusting the rigidity of the layers, or the rigidity of the boundary between the layers.

In one or more embodiments the structural layer may have a first surface and a second surface. The first surface and/or the second surface of the structural layer may be seen as the part of the layer which intersects with the first axis, when the first wall is in an uncompressed state. The first surface and/or the second surface of the structural wall may be seen as the part of the layer which faces a preceding or subsequent layer of the first wall. Thus, the first surface and/or the second surface may have a tangential axis (seen in a cross-sectional view) that is substantially orthogonal to the first axis. The first surface and/or the second surface may be seen as the part of the layer that abuts another layer of the wall.

The uncompressed state of the first wall may be where the first axis intersects all the layers of the first wall and/or at least a plurality of the layers of the wall, when the wall is constructed in a linear manner, where each layer of the wall is stacked on top of each other along the first axis. The intermediate state of the first wall may e.g. be where the first axis intersects all the layers of the first wall and/or at least a plurality of the layers, where the compressive force may e.g. be too low to force one or more layers of the wall to deflect from the first axis. The compressed state of the first wall may be where at least one layer of the first wall is deflected away from the first axis.

In one exemplary embodiment the primary structural layer may abut the first flexible layer and the second flexible layer along the first axis. This means that the primary structural layer of a first wall may have a first flexible layer on a first side of the primary structural layer, and a second flexible layer on an opposite second side of the primary structural layer. Thus, the first axis may intersect a flexible layer, a structural layer and a flexible layer in this order along the length of the first axis. This allows the primary structural layer to be surrounded by flexible layers, i.e. on top and bottom, allowing the flexible layers to deform prior to the deformation of the structural layer when a force is applied to the first wall.

In one or more embodiments the flexible layer may have a primary surface and a secondary surface. The primary surface and/or the secondary surface of the flexible layer may be seen as the part of the layer which intersects with the first axis, when the first wall is in an uncompressed state. The primary surface and/or the secondary surface of the flexible wall may be seen as the part of the layer which faces a preceding or subsequent layer of the first wall. Thus, the primary surface and/or the secondary surface may have a tangential axis (seen in a cross-sectional view) that is substantially orthogonal to the first axis. The first surface and/or the second surface may be seen as the part of the layer that abuts another layer of the wall.

The layers of the first wall may fuse, bond, blend, integrate and/or merge where the boundary between two layers of the wall may be indistinguishable when the wall structure has been formed. However, during the 3D printing of the first wall or any subsequent wall, the wall is formed layer by layer, where one layer is positioned on top of a preceding layer (a layer that has already been formed and positioned) where a first surface of the preceding layer abuts a second surface of the subsequent layer (a layer that is positioned on top of the preceding layer). The positioning of the two layers may occur prior to curing, so that the first and the second surfaces intersect, and may be indistinct from each other. Alternatively, the first surface may bond or adhere to the second surface in a permanent manner, where the boundary between the two layers may be seen in microscopic view of a section of the first wall or any subsequent wall.

In one or more embodiments the rigidity may be in the longitudinal direction. The longitudinal direction may be a direction that is parallel to the first axis of the first wall. The rigidity of the layers of the first wall or any subsequent wall may be seen as a rigidity which represents the flexibility of the layer in the longitudinal direction. I.e. where the rigidity represents how the layer is predisposed of moving in a longitudinal direction. A high rigidity will mean that the layer may need an increased force to dispose the layer in a longitudinal direction, compared to a layer having a lower rigidity, and vice versa.

In one or more embodiments the rigidity may be in a transverse direction. The transverse direction may be a direction that is transverse to the first axis of the first wall. The rigidity of the layers of the first wall or any subsequent wall may be seen as a rigidity which represents the flexibility of the layer in the transversal direction. I.e. where the rigidity represents how the layer is predisposed of moving in a transverse direction. A high rigidity will mean that the layer may need an increased force to dispose the layer in a transversal direction, compared to a layer having a lower rigidity, and vice versa.

In one or more embodiments the rigidity may be in a rotational direction. The rotational direction may be a direction that rotates along a longitudinal axis of a layer first wall, where the longitudinal axis of a layer of the first wall may be substantially orthogonal (right angled) to the to the first axis of the first wall. Thus, the rigidity of the layers of the first wall or any subsequent wall may be seen as a rigidity which represents the flexibility of the layer in a rotational direction. Thus, when a compressive force is applied to the wall of the structure, the one or more layers may deflect away from the first axis of the wall, where a layer may be bonded to another layer, which means that the compression force will cause a torque to be applied to the layer or both layers. The rigidity of the layer may in a rotational direction may e.g. represent the connection between two layers, the rotational flexibility of a single layer. The flexibility in a rotational direction may be seen as the resistance to a twisting motion of the layer in response to an applied force, i.e. how the layer resists a rotational motion in response to an applied force. The rotational rigidity and/or stiffness may also be seen as the torsional rigidity, stiffness and/or flexibility.

In one or more embodiments the structural layer may have a width (transversal to the longitudinal axis) that is larger than of the thickness of the flexible layer.

The structural layer has a width (transversal to the longitudinal axis) that is more than 110%, 120%, 130%, or 150% of the thickness of the flexible layer. The structural layer may have a width that is about double the width of the flexible layer.

The structural layer may be formed as two or more layers of flexible material that abut each other in a transversal direction. This means that the two layers may be positioned in a single layer of the walled structure, and where each layer bonds to the preceding and/or subsequent layer of the structure as well as the layer beside in a transverse direction. Thus, the primary structural layer, or any subsequent layer may be constructed of two or more layers of material, where each layer is comparable to the flexible layer of the walled structure. The provision of two or more layers of material to form a structural layer will increase the rigidity of the layer of the wall, as the material may have an increased width, when the two or more layers are bonded to each other, as well as being bonded to the abutting layers in the longitudinal direction. The two abutting layers may have a height (in the longitudinal direction) that is comparable or the same as the height of the flexible layer, where the introduction of the abutting layer does not alter the height of the structural layer. Thus, the structural layer may have a similar or the same height as the flexible layer.

In one or more embodiments the first wall may have at a secondary structural layer and/or at least a third flexible layer. The secondary structural layer may be further provided to a wall of the 3D printed structure, in continuation of the primary structural layer and/or a flexible layer, where the further structural layer may be provided to increase the height of the wall and/or to increase the rigidity of the wall. A third flexible layer may further be provided to the wall of the 3D printed structure in continuation of the primary structural layer, secondary structural layer, first flexible layer and/or the second flexible layer, where the further flexible layer may be provided to increase the height of the wall and/or to decrease the rigidity of the wall. The first wall or any subsequent wall may be provided with a plurality of structural and/or flexible layers in order to provide a predefined length of the wall along the direction of the first axis.

In one or more embodiments the order of the structural layer and the flexible layers may be repeated along the first axis. This means that the order of the structural and the first and the second flexible layers may be reproduced along the length (along the first axis) the wall, where the primary structural layer and the secondary structural layers may be separated by one or more flexible layers, in one example, the two structural layers are separated by two flexible layers. Thus, the length of the wall may have a structure where a structural layer may abut one or two flexible layers on each side (above and below along the longitudinal length) where this order may be repeating along the length of the wall.

In one or more embodiments the first wall may have a repeating layered structure along the longitudinal axis of at least one primary structural layer and at least one flexible layer.

This means that the flexible layers may be configured to defer from the compressive force which is applied to the first wall, in the areas that are between two structural layers, so that the wall can reduce in height from its first end to its second end.

In one or more embodiments the primary and the secondary structural layers may be separated by at least the first flexible layer. By separating the primary and the secondary structural layer with at least one flexible layer, it is possible to control the deformation of the first wall along its longitudinal axis, where the flexible layer, which has a lower rigidity than the structural layer will deform prior to the deformation of the structural layers. Thus, it is possible to predict more precisely on how the first wall deforms, and it is therefore possible to adjust the rigidity of the structural layer, and/or any walls surrounding the first wall, to provide a first wall having a predictable and controllable collective rigidity of the entire wall on its own.

In one or more embodiments the height of the structural layer may be substantially similar to the height of the flexible layer. By providing the structural layer in a similar height as the flexible layer, where in one or more embodiments the height of the structural layer is the same as the flexible layer, it may be possible to exchange a structural layer with a flexible layer, and vice versa, during the construction of the wall, without having to recalibrate the total height of the wall due to the exchanging of one structural layer with a flexible layer, or vice versa. Thus, the length in the direction of the first axis (height or total height) of the wall to be manufactured/printed may be defined out of the total number of layers, where the specific number of the specific layers does not influence the length of the wall, and the specific type of layer can be interchanged without specific modification and calculation of the total length of the wall. This also means that the introduction of a structural wall can be done selectively in any position in a layer of the article to be 3D printed, without influencing subsequent layers of article, and there is no need to compensate for the structural layer in a subsequent layer of the wall.

In one or more embodiments the primary structural layer may be separated in the longitudinal direction by two or more flexible layers. By separating the primary structural layer with two or more flexible layers, it means that in the longitudinal direction (direction of the first axis) the primary structural layer is followed by at least two flexible layers. This means that the at least two flexible layers provide the wall with a zone (in the longitudinal direction) that may be seen as more flexible (less rigid) allowing the wall to collapse in this zone in an easier manner. Thus, the provision of two flexible layers abutting each other in the direction of the first axis, may also mean that the flexibility of the bond between the two layers is less than between a structural layer and a flexible layer, which may mean that one flexible layer may deflect easier from the other flexible layer, when a compressive force is applied to the wall in the direction of the first axis.

In one or more embodiments the first flexible layer may abut the primary structural layer. By having a primary structural layer abut a first flexible layer, in the direction of the first axis, the flexibility of the wall may be increased in the direction of the first axis. The flexible layer will have a lower rigidity that the structural layer, so that the total rigidity of the two layers combined will be less than having e.g. two structural layers abutting each other. Thus, it is possible to increase the flexibility of the wall by a provision of a flexible wall, without changing the composition of the material used for 3D printing.

In one or more exemplary embodiments the first wall, the second wall, third wall or any subsequent wall may have a first height and a first end and a second end, where a primary structural layer is positioned at least a distance of 20% of the first length from the first end and/or at least a distance of 20% from the second end. The first height may be the distance from the first end to the second end along a first axis. Thus, in one example where the first wall has a height of 10 mm, a primary structural layer may be positioned in an area that is between 2 and 8 mm of the height of the first wall. This means that the wall may have a structural layer that is positioned in a central region of the wall. Therefore, a central area of the first wall may have both a first and second flexible layers as well as a structural layer. Thus, it may be possible to control the deformation of the first wall when a force is applied to the wall. In a second example the central region of the first wall may have two or more structural layers, where the structural layers may be separated by one or more flexible layers.

In one or more embodiments the first axis may intersect a central axis of the structural layer and/or the flexible layer. This means that the first wall may be provided in such a way that the structural and flexible layers are provided in a linear manner, where each layer is stacked on top of each other in a direct manner, so that any compression force that is applied to the first wall in a direction parallel to the first axis, is transmitted through all the layers of the wall that have a central axis that intersects the first axis. The central axis of the layers may be seen as a longitudinal axis that follows the length of the layer, and may be seen as perpendicular to a cross sectional plane of the layer.

In one or more embodiments the elastic material may be a silicone material or a mixture of a silicone material. The 3D printing may be done by adding one layer on top of another layer, and continuing this until the wall has a desired height. The 3D printing may advantageously be done using a liquid form polymer, that cures when it has been positioned in its correct position. Thus, the 3D printed structure may be made of a polymeric material when cured. An example of this is a liquid silicone polymer, that is added in the same direction as the layer which it is positioned on top of, so that a wall may be a number of discrete lines of polymer added on top of each other, where the lines are parallel to each other when 3D printed on top of each other. The material is advantageously elastic, so that the deformation of the material, during application of pressure is reversible, and the material does not plastically deform when it is elastically deformed, I.e. having a high ratio of stress/strain relationship before a plastic deformation occurs.

In one embodiment the hardness of the polymer may be between 20 and 90 Shore A when cured, preferably between 30 and 85 Shore A, more preferably between 35 and 80 Shore A, more preferably around 40 to 60 Shore A. One example of a polymer is silicone, where one type may be Dow Corning LC3335 Liquid Silicone Rubber designed for 3D printing, having approximately 50 Shore A hardness. Other types of polymers and silicones that are adapted for 3D printing may also be utilized, and the specific type of silicone or polymer is not essential for the invention, but the elasticity, the hardness and the capability of 3D printing may be seen as the important factor.

The 3D printing method use is the Fusion Deposition Modelling, that forces two defined fluids through a static mixer, which subsequently extrudes out of a nozzle, which depends on the precise application. One printing apparatus that may be used is the German RapRap GMbH 3D printer X400 PRO 3D printer. Other types of printers could be used.

In one embodiment the thickness of each layer may be between 0.1 and 1.6 mm, more preferably between 0.2 and 1.2 mm, more preferably between 0.3 and 1.0 mm, or more preferably between 0.4 and 0.9 mm. The thickness of the layers may be controlled by either the thickness of the 3D printed lines, and/or a multiplicity of the 3D printed lines. The thickness of the lines may control the resistance of the walls, as an increased thickness will provide an increased resistance and/or increased rigidity.

In one or more embodiments the structural layer may be made from a first material composition and/or where the flexible layer is made from a second material composition, where the first material composition is different from the second material composition. Thus, the 3D printed structure may be made out of at least two different material compositions, where the material composition may influence the behaviour and the compressibility of the layers when applied with a compressive force.

The form of the 3D printed structure may be adjusted by providing the walls in a different number of layers, where the part of the 3D printed structure that is intended to have a reduced height may be provided with walls having a low number of layers, where the parts of the 3D printed structure that is intended to have an increased height may be provided with an increased amount of layers positioned on top of each other.

In an example where the 3D printed structure may be a midsole for a shoe, the areas that are intended to have a lower height may e.g. be the forefoot area, where the higher areas may e.g. be the arch area on the medial part of the 3D printed structure, and e.g. the heel area. Thus, as the 3D printed structure may be utilized to be formed completely after the form of the foot of the specific user, the shoe which the midsole is to be used in may be formed in a relatively generic form, where the upper and the outsole may be joined together, where inner surface of the outsole may be relatively flat and not shaped to the form of the foot in the sense of the height. Thus, the inner surface of the outsole, i.e. the foot facing surface of the outsole, or the foot facing surface of the shoe, if it is provide with an intermediate part, may be relatively flat, and may be provided as a receiving surface for the lower part of the 3D printed midsole. Thus, the foot facing surface of the outsole may be provided in the shape of the foot, in the longitudinal and transversal directions but not having any characteristic foot shape in the height direction, i.e. in the direction perpendicular to the longitudinal and/or the transversal direction of the foot. Thus, a shoe having the correct size (along the longitudinal axis of the shoe) for the user, may be provided with a 3D printed midsole that is specifically formed for the user on the foot facing surface, especially in the height direction, to the contours of the foot of the user, and may be enforced or softened in areas that are specifically chosen for each specific user, in the form of a gait, force transferred from the foot, as well as a contour analysis of the foot either during walking, running or stationary positioning.

Thus, the present invention may also relate to a shoe having a 3D printed midsole, made of a 3D printed structure in accordance with the above disclosure.

Another way of controlling the resistance of the 3D printed structure is how one wall is connected to a second wall, as well as the form of the wall. If one wall is connected to another wall at an angle, i.e. that the planes of the walls intersect at an angle, the second wall may provide an increased resistance to the first wall and vice versa, as the walls are angled towards each other and provide structural resistance to each other, especially if one wall is connected to a second wall along its entire height.

The 3D printed structure may be provided with a plurality of walls, where the plurality walls define a plurality of cells having a central axis that is substantially parallel to the walls and having a radius from a wall to the central axis.

When pressure is applied to the walls and when the force applied to the wall exceeds a certain limit, the wall will deform, and as the bottom end (second end) of the wall is restricted inside the shoe by the foot facing surface of the outsole, the first end will move in a direction towards the second end, and for this to happen, the wall will deform, by buckling, expanding or other ways, in order to allow the first end to move in a downwards direction. As the wall will deform, it may be advantageous that the deform of the wall is unrestricted in at least one direction, i.e. in the direction towards the central axis of the cell. Thus, the deformed wall is allowed to deform freely into the cell, so that the radius between the wall and the cell is reduced in at least one area. The form of the cell, e.g. the shape of the cell seen from above or the side, may also influence the deformation of the wall, as a connected wall and the angle of the connection may increase or decrease the resistance of the wall.

A single cell may be provided by a circular wall, that in multiple layers provides a cylindrical wall, where the outer surface of the wall may be connected to a second wall. Thus, the cell structure may be a plurality of cylindrical cells, connected to other cylindrical cells via the walls. The circular wall may comprise the first wall, the second wall and/or the third wall, where the first wall, second wall and/or the third wall may be areas of the circular wall at different positions along the circular wall. Thus, the first wall may e.g. be positioned at angles 0-60 degrees, while the second wall may be positioned at 61-120 degrees, the third wall may be positioned at 121-180 degrees. Alternatively, the first wall may e.g. be positioned at angles 0-120 degrees, while the second wall may be positioned at 121-240 degrees, the third wall may be positioned at 240-360 degrees. The circular wall may have a rotation that is 360 degrees, where the rotation is around a central axis of the circular wall, where the central axis extends through the centre of the circular wall.

In one or more embodiments the first layer may abut the second layer in a direction of a first axis. This means that the first layer may be positioned on top of the second layer, or may be positioned below the second layer. By positioning the layers on top of each other the first layer and the second layer provide a part of the 3D printed construction, which may be constructed as a structure of multiple layers that may be positioned on top of each other. The wall parts of the 3D construction may therefore create a 3D printed structure where one layer of a wall structure may have a different rigidity than another layer of the same wall structure, and/or where one layer of a wall part may have a different rigidity than a layer of a different wall part in the same layer In one or more embodiments the second wall part of the second layer may comprise a secondary structural layer or a third flexible layer By providing the second wall part with a secondary structural layer or a third flexible layer, the 3D printed structure of the first wall part may have as many layers as the second wall part, and may have a similar rigidity or a lower rigidity than the first wall part, respectively. I.e. when both the first wall part and the second wall part have the same number of layers, and where both wall parts have a structural layer and a flexible layer, their combined rigidity is substantially similar. However, when the first wall part and the second wall parts do not have the same amount of flexible and structural layers, the rigidity of the wall part having fewer structural layers is lower than the wall part having a higher number of structural layers. Thus, it is possible to control the rigidity of the wall parts by adjusting the number of structural and flexible layers.

In one or more embodiments the first flexible layer may abut the secondary structural layer or the third flexible layer. This means that the secondary structural layer or the third flexible layer may provide a specific structure to the second wall part, where the secondary structural layer may increase the combined rigidity of the second wall part by abutting the second flexible layer, or the third flexible layer may ensure that the rigidity of the second wall part is lower than the corresponding layers of the first wall part.

In one or more embodiments the 3D printed structure may comprise a third wall. The third wall may provide the 3D printed structure with an increased variability, where the third wall may be constructed of similar layers as the first wall and/or the second wall, but where the third part may have a different layered structure in the direction of the first axis than the first and/or the second wall in the corresponding layers. Alternatively, the third wall may have a similar structure to the first wall and/or the second wall, should this be required by the construction of the 3D printed structure.

In one or more embodiments the first layer may further comprises a third wall part, where the third wall part comprises in the first layer a second flexible layer or a secondary structural layer. The third wall part may provide a further layer to the 3D printed structure, where the third wall part may have a similar rigidity as the first wall part and/or the second wall part in the same layer, or may have a different rigidity, i.e. higher or lower rigidity, than the first wall part/and or the second wall part.

In one or more embodiments the second layer comprises a third wall part, where the third wall part comprises a flexible layer or a structural layer in the second layer. The third wall part may have the same number of layers as the first wall part and/or the second wall part, so that the height of the first, second and third wall parts is same.

In one or more embodiments the first wall may abut the second wall and/or the third wall may abut the second wall, in a direction along a second axis. This means that the walls may extend in a certain direction. The second axis may also be part of a circular direction, where the first wall, second wall and third wall may be connected in an annular or polygonal manner, creating parts of a closed structure, such as a cell. Thus, the first, second and/or third walls may abut each other in an annular manner, or parts of an annular manner, where the walls form a part of an annular structure.

In one or more embodiments the second flexible layer may abut the first structural layer. The second flexible layer may abut the first structural layer in a direction along a second axis, where the second flexible layer is positioned to the side of the first structural layer seen along the direction of the second axis.

The above discloses that the first layer of the 3D printed structure has a different structure than the second layer. The walls of the 3D printed structure may extend along a first axis, while the second wall may be positioned to a side of the first wall, i.e. in a direction that is at a right angle from the first axis. Within the meaning of the present disclosure the second axis may be orthogonal to the first axis. Thus, 3D printed structure may have a number of layers having a varying structure in at least two directions, where the structure of the first wall part and the second wall part, or any subsequent wall part, may be repeated in a different part of the 3D printed structure. This may mean that the structure of the first wall part and the second wall part may be repeated in a direction of the first axis and/or the direction of the second axis, in order to provide a plurality of walls and/or a plurality of layers to provide a 3D structure having a specific rigidity, which may be a combination of structural layers and flexible layers in one or more walls or wall parts of the 3D structure.

In one embodiment there may be provided 3D printed structure of an elastic material having at least a first layer and a second layer, the 3D printed structure comprising: at least a first wall comprising at least a primary structural layer and at least a first flexible layer, at least a second wall comprising at least a secondary structural layer and at least a second flexible layer, where 3D printed structure comprises a third axis, where the third axis intersects the first and the second layer and where third axis intersects the primary structural layer and the secondary structural layer, where the primary structural layer has a first rigidity and the first flexible layer has a second rigidity, where the first rigidity is larger than the second rigidity.

The provision of the above 3D printed structure, where the third axis intersects both layers of the 3D printed structure, and the primary and secondary structural structure means that the third axis is provided at an angle to first and second layers, where the first and the second layers are substantially parallel in relation to each other. This may also mean that the angled third axis may extend through the first layer, into the second layer, and continue to a subsequent layer to the second layer. Furthermore, the presence of the structural layers in different walls of the 3D printed structure, where the first and the second walls may have a substantially parallel first axis. This also means that the third axis is at an angle to the walls of the 3D printed structure. I.e. the third axis may be seen as having an angle that is between the first axis which is parallel to the first wall and the second axis which is parallel to the first layer. I.e. if the first axis has an angle that is 90 degrees, and the second axis has an angle that is 0 degrees, the third axis has an angle that may be higher than 0 degrees, but lower than 90 degrees, allowing the third axis to intersect at least two layers of the 3D printed structure, and at least two walls of the 3D printed structure.

The intersection of the third axis in layers may mean that the first layer and the second layer are different from each other, and that the primary structural layer and the secondary structural layer are separated from each other, i.e. where the axis may not intersect the layers of the first and second structures and/or the structural layers of the walls in the same positions. Thus, the layers of the 3D structure and the structural layers may intersect the third axis in different positions of the third axis, i.e. that the intersections in the layers of the 3D structures are at different positions along the third axis, and similarly with the structural layers of the walls.

By positioning the structural layers along the third axis, it may be possible to obtain a interaction between structural layers and/or flexible layers in different layers of the 3D printed structure, where the increased rigidity of the structural layers, compared to the flexible layers, may create a resilience/spring effect between the two layers, in different walls, allowing different walls of the 3D printed structure to have a resilient mechanical interaction between the walls, so that the rigidity of the 3D printed structure provided by the structural layers may follow throughout the 3D printed structure along the third axis.

In one or more embodiments where the 3D printed structure may comprise a third layer and optionally further comprises at least a third wall comprising at least a tertiary structural layer and at least a third flexible layer, where the third axis intersects the third layer and the tertiary structural layer. Thus, the 3D printed structure may be provided with a further wall having a tertiary structural layer, as well as at least a third layer of the 3D printed structure, where the third axis both intersects the third layer, as well as the third structural layer. Thus, the third wall may provide a further connection to the first and the second wall in order to provide a resilient relationship between the first and second wall, as well as the third wall. As the third axis intersects the tertiary structural layer, the increased rigidity of the three structural layers, compared to the flexible layers which may surround the structural layers in the walls, may follow the third axis through multiple layers and multiple walls of the 3D printed structure.

In one or more embodiments the first wall, second wall, and/or third wall may comprise a primary first axis, secondary first axis and a tertiary first axis, respectively. The first second and/or third walls may each comprise a first axis, where the structure of the flexible and structural layers in the wall may follow the first axis. The structure may differ from one wall to the other, or it may be similar for each wall, e.g. where the positioning may be shifted from one wall to the other. I.e. where the structural layer is in the first layer in the first wall, in the second layer in the second wall, and in the third layer in the third wall, and so on.

In one or more embodiments the primary structural layer and the secondary structural layer may be positioned in different layers in the 3D printed structure. By providing the primary structural layer and the secondary structural layers in different layers of the 3D printed structure it may be possible to shift the rigidity of the wall in a diagonal manner from one wall to the other wall, i.e. where the increased rigidity in the second wall is provided in a layer that is lower or higher than the structural layer in the first wall.

In one or more embodiments the tertiary structural layer may be positioned in different layers in the 3D printed structure than the primary and/or secondary structural layers in the 3D printed structure. Thus, the tertiary structural layer may be in a layer that is different from the primary and secondary structural layers. I.e. if the primary layer is in the first layer, the secondary in the second layer, the tertiary structural layer may be in a layer that is different from the first and/or the second layer. Thus, the structural layer may thereby be shifted in height from one wall to the other, allowing the rigidity of the structural layer to be translated along the third axis.

In one or more embodiments the first wall may abut the second wall, and/or where the third wall may abut the second wall. By having the first and the second wall abutting each other, and optionally having the third wall abutting the second wall, it may be possible to translate the rigidity from one wall to the other directly. Thus, the rigidity of the structural layer in one wall may be transferred directly to another wall where the rigidity of the wall will be influenced by the structural layer in the abutting wall. Furthermore, by having the walls adjacent to each other, and having a third axis which intersects the structural layers, the rigidity may translate from one wall to the other, and create a cooperative effect that translates between the walls of the 3D printed structure.

In one or more embodiments the first wall and the second wall, and optionally the third wall may form part of a closed cell defining a predefined volume of the cell. Thus, the closed cell seen from above may have a view where the walls define a boundary for the cell, and may be parts of a plurality of walls that create the closed cell. The closed cell, may e.g. have six walls, that are connected in an annular manner, e.g. as a hexagonal shape, where the first wall abuts the second wall and the third wall abuts the second wall, and the fourth wall abuts the third wall, etc. The closing of the cell may e.g. be where a sixth wall abuts the first wall, on the opposite side of the first wall. By having a structural layer in each wall, and the layers may be intersected by a third axis, the structural layers may translate in an upwards or downwards direction when comparing one wall to its abutting wall. Thus, the rigidity of the walls of the closed cell may alter from one wall to the other. The closed cell may have any suitable form.

In one or more embodiments the third axis may be a helical axis and/or a spiral axis. By providing the third axis in the form of a helical and/or spiral axis the axis may follow a coiled path, where the coiled path may e.g. follow the walls (i.e. the peripheral walls) of a closed cell. By providing the third axis in e.g. a helical path, and where the third axis intersects a structural layer in a wall, the structural layers of the walls may also follow a helical path. This therefore means that the rigidity of the walls may be formed in a helical manner, so that a closed cell may e.g. have a rigidity profile which emulates a coiled spring along the periphery of the closed cell. This therefore means that the walls of the closed cell may perform in a similar manner to a coiled spring, where a force applied in a direction of a first axis is transferred from one wall to the other via the structural layers, where the force is transferred both in a sideward direction (second axis) as well as a upwards and/or downwards direction when following the path of the helical axis. Thus, the walls and the structural layers may be utilized as a mechanical device which may be used to store energy and subsequently release it to absorb shock or to maintain a force between contacting surfaces.

In one or more embodiments the primary structural layer is part of the first layer and the secondary structural layer may be part of the second layer. Optionally, the tertiary structural layer may be part of the third layer. This provides a structure of the walls, where the structural layers of walls may be offset by one layer compared to the previous wall. This may also mean that where the structural layer is positioned in a layer, the structural layer is an integral part of the layer, or the layer in a certain position may comprise or consist the corresponding structural layer.

In one or more embodiments intersection of the third axis in the primary structural layer may be in the same position as in the intersection in the first layer and the intersection of the third axis in the secondary structural layer may be in the same position as the intersection of the second layer. Optionally, the intersection of the third axis in the tertiary structural layer may be in the same position as the intersection of the third layer. Thus, the third axis will intersect the structural layer and the layer in the same position, so that the intersection in one layer and one structural layer may be seen in at least one point in a three-dimensional space.

BRIEF DESCRIPTION OF THE DRAWINGS

The following is an explanation of exemplary embodiments with reference to the drawings, in which FIGS. 2a, 2b, and 2c shows a sectional view of a 3D printed wall, and how the wall may react when a compressive force is applied.

FIG. 3 shows a perspective view of one example of a 3D printed wall

FIG. 4 shows a sectional view of a further embodiment of a 3D printed wall,

FIG. 5 shows a microscopic view of three sections of 3D printed walls,

FIGS. 6a, 6b and 6c shows three separate layers of a 3D printed structure.

DETAILED DESCRIPTION

Figure 1A:
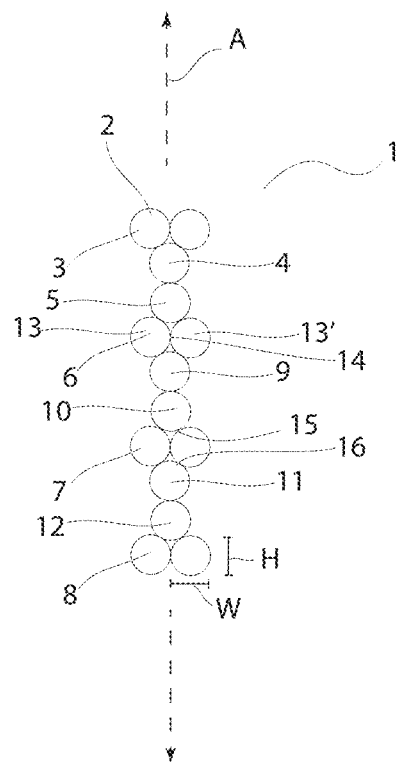
FIGS. 1a and 1b show sectional view of a first and a second embodiment of a 3D printed wall in accordance with the description.

FIG. 1 shows a first exemplary embodiment of a 3D printed structure 1 seen in a schematic sectional view, having a first wall 2 having a plurality of layers extending along a first axis A. The first wall 2 comprises a primary structural layer 3, a first flexible layer 4 and a second flexible layer 5. In this exemplary embodiment, the first wall 2 comprises a secondary structural layer 6, a tertiary structural layer 7 and a quaternary structural layer 8, where the secondary 6 and the tertiary 7 structural layers, as well as the tertiary 7 and quaternary 8 structural layers each are separated by two flexible layers 9, 10, 11, 12, respectively. I.e. where the structure of the primary structural layer 3 and the first and 3 the second 4 flexible layers is repeated along the length of the wall 2 in the longitudinal direction A of the wall 2.

The primary structural wall 3 and the first 4 and second 5 flexible walls, as well as the subsequent walls, are 3D printed using an extruded line of flexible material having a height H and a width W, and where one layer of material in the 3D printed structure may be the height H, and may be applied in a continuous manner as required in the 3D printed structure.

In this embodiment, the structural layer 6 in this wall 2 are provided as two separate lines 12, 13 of extruded flexible material, where the two separate lines 13, 13' are joined to each other at a joining side wall, where the joining side wall 14 provides a permanent bond between the two lines 13, 13' of material. Furthermore, the structural layer 6 may be joined to at least one flexible wall 5, 9 where an upper 15 or a lower 16 wall of the flexible wall may be joined to an upper or lower wall of the structural layer 6, creating a permanent bond between the two layers. The bond between the layers may extend along the entire length of the layer 6, 5, 9 along an axis B which is substantially perpendicular to the 2D plane represented in the present sectional view. The flexible layers 9, 10 may also be bonded along the entire length of the layer 9, 10. As seen in this embodiment, the structural layer 6, has a width that is approximately twice the width (2W) of the flexible layer 5, 9 (W). The width of the structural layer 6, ensures that the layer has a higher rigidity than the flexible layers 5, 9, so that when a compressive force is applied in the direction of the first axis A to the wall 2 the structural layer 6 will resist deformation for a longer time than the flexible layer. The same considerations may be made for all the structural and flexible layers shown in FIG. 1a.

Figure 1B:
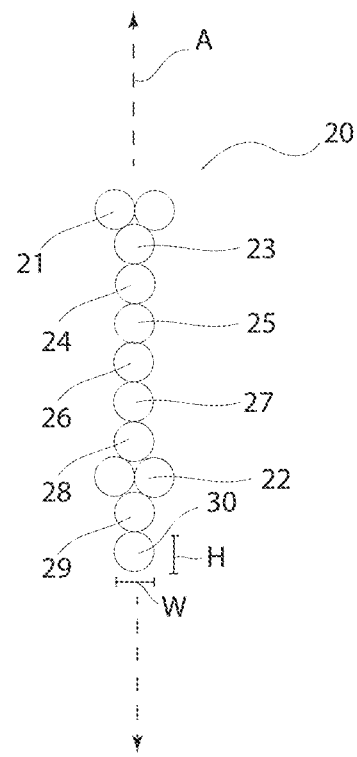

Similarly, FIG. 1b shows another exemplary embodiment of a wall 20, where the wall comprises a primary structural layer 21, a secondary structural layer 22, as well as six flexible layers 23, 24, 25, 26, 27, 28 that separate the primary structural layer 21 from the secondary structural layer 22, in a direction of the first axis A. Two more flexible layers are provided below the secondary structural layer 22. In this embodiment, the number of flexible layers is increased in view of the embodiment shown in FIG. 1a, which means that collective rigidity of the wall 20 is less than the wall 2 shown in FIG. 1a, assuming that the two walls are manufactured in a similar manner, of a similar material and similar dimensions as the lines of flexible material having a similar height (H) and width (W). The increase in flexibility is due to the fact that the wall has more flexible layers per unit of length along the axis A, than the wall 2 in FIG. 1a. Thus, when a compressive force is provided in the direction of axis A, the structural layers 21, 22 will resist deformation while any one of the flexible layers 23, 24, 25, 26, 27 may deform prior to the structural layers 21, 22.

Figure 2A:
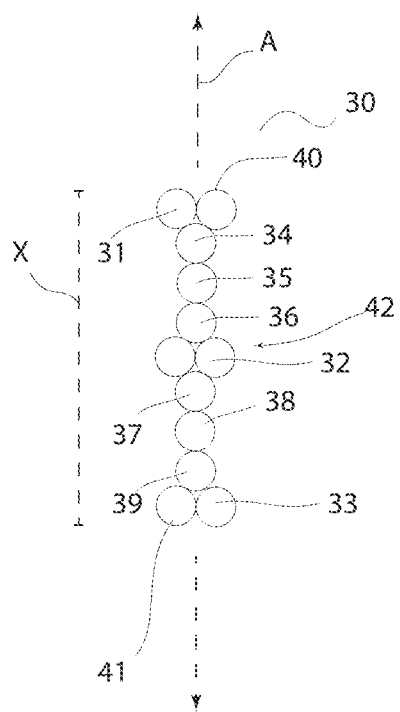

FIG. 2a shows a wall 30 having three structural layers 31, 32, 33 that are separated from each other by a first set of three flexible layers 34, 35, 36 and a second set of flexible layers 37, 38, 39. When the wall 30 is in its uncompressed state the first axis A intersects a central part of each layer, so that the wall 30 may have a substantially straight shape.

An increase in compression force in the direction of the axis A will cause a deformation of the flexible material of the layers 34, 35, 36, 37, 38, 39 causing the shape of the wall 30 to change due to the flexibility of the material, and with an increase in compressive force, the wall 30 will eventually deform in such a way that the wall will bend away from the first axis A. In the assumption that the first end 40 of the wall and the second end of the wall 41 are in a fixed in position, the deformation of the wall will most likely occur in a central part 42 of the wall 30, where the central part 42 of the wall 30 will deflect away from the first axis A. As the wall is made up of layers having different rigidity, it is highly likely that the parts of the wall having a lower rigidity, such as the flexible layers 34, 35, 36, 37, 38 39 will be the first areas that will deform, and therefore cause the deflection of the wall from the axis A in the areas of the flexible layer 34, 35, 36, 37, 38, 39 where the structural layers 31, 32, 33 will resist the deformation up to a certain point. One example of the deformation may be seen in FIG. 2b, where two flexible layers 35, 38 have deflected in a transverse direction C, where both layers have deflected in the same direction c1, causing the length of the wall to reduce from its initial length X to its compressed length Y, as may be seen in FIG. 2b.

In FIG. 2c, the same situation is shown, where a compression force has to be applied to the wall 30, where the flexible layer 35 deflects in the direction c1 and the flexible layer deflects in the direction c2. The directions c1 and c2 are only shown as examples, and the flexible layers can deflect in the same direction, opposite directions, or alternate directions. A similar deflection may occur when the number of flexible layers is only two, where the flexible layer may deflect in a direction away from the first axis A in a direction shown by the axis C.

FIG. 3 shows another embodiment of a 3D printed structure 1, seen in a schematic, having a schematic sectional view, having a wall 50, where the wall comprises at least a primary structural layer 51, and a first flexible layer 52 and a second flexible layer 53. The wall further comprises a secondary structural layer 54, as well as four additional flexible layers 55, 56, 57, 58. Each of the layers of the wall 50 has a longitudinal axis D, which extends along the centre of the layer along the length of each layer.

The 3D printed structure shown in FIG. 3, is formed so that the longitudinal axis D of the layers 51-58, is substantially centered along the length of the wall 50 in the direction of axis A, i.e. that the axis D intersects the longitudinal axis D of each of the layers. This means that when a compression force is applied to the wall 50 in a direction of the axis A, the force translates to the centre of each layer, and may assist the wall 50 in maintaining its height (X as shown in FIG. 2*a*) up to a predefined magnitude of compression force, before the flexible layers begin to deform and defer away from the longitudinal axis A, similar to what is shown in FIGS. 2*b* and 2*c*.

Figure 2B:
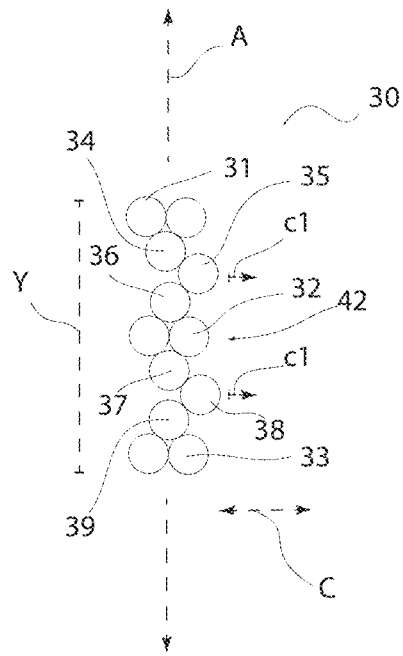

FIG. 4, shows a schematic sectional view of a wall 60, having three structural layers 61, 62, 63 and six flexible layers 64, 65, 66, 67, 68, 69, similar to what is shown in FIGS. 2*a*-2*c*. In this exemplary embodiment, the longitudinal axis D of flexible layers 65 and 68 has been offset in the direction c1 and c2 away from the longitudinal axis of the wall 60, where this offset of the longitudinal axis ensures that when a compression force is applied in the direction of the longitudinal axis A of the wall 60, the flexible layers 65 and 68 are predisposed or biased to deflect in the directions c1 and c2, allowing the wall 60 to bend in these directions. The offset of the longitudinal axis of the layers does not necessarily have to be in opposite directions, but may be in the same direction. The offset may also be introduced into one or more of the structural layers, in order to translate the compressive force in a diagonal direction (a product of direction A and direction c1 or c2) to force a specific deformation of the wall.

FIG. 5 shows a microscopic view of a sectional cut of a 3D printed structure, showing three examples of walls 70, 80 and 81, each having a first end 71 and a second end 72, where each wall 70, 80, 81 has a plurality of flexible layers 73 and a plurality of structural layers 74, where the structural layers 74 are separated by flexible layers. As may be seen in this figure, the layers of material bond with each other, creating a somewhat uniform structure from the first end 71 to the second end 72, where each layer 73, 74 are fused to each other. Here it is clear that the structural layer has a larger width (2W) than the flexible layers (W), which increases the rigidity of the structural layers 74 is higher than the rigidity of the flexible layer 73.

FIGS. 6*a*-6*c* show separate layers of a 3D printed structure, where FIG. 6*a* shows a first layer 90, FIG. 6*b* shows a second layer 91 and FIG. 6*c* shows a third layer 92. When the 3D printed structure is being constructed via 3D printing, where the first layer 90 may be seen as a base layer, the second layer 91 may be positioned on top of the first layer 90, and the third layer 92 may be positioned on top of the second layer 91. If a fourth layer is to be added to the 3D printed structure, the fourth layer may e.g. have the same structure as the first layer.

As may be seen in FIGS. 6*a*-6*c*, each layer is has a continuous line 94 that follows a zig-zag pattern from the right side 95 to the left side 96 of the layer 90, 91, 92. The construction may be formed in such a way that the line creates a plurality of hexagons 97, where each hexagon has six walls 98. Two of the adjacent hexagons 97*a*, 97*b* to one hexagon are printed in such a manner that there are two walls 98*a*, 98*a*' that separate the hexagons 97*a* and 97*b*, while, while four of the adjacent hexagons 97*c* (only two of these have reference numbers) have a single wall separating from the first hexagon 97. Thus, the two walls in a single layer create a structural layer, as the two walls 98*a*, 98*a*' bond with each other and have a higher rigidity than the single wall. Thus, the hexagons that are only separated by a single wall 98*b*, 98*c*, 98*e*, 98*f*, create a flexible wall.

The next layer, i.e. the second layer 91, as shown in FIG. 6*b*, is then produced, in such a way that the structure of the layer 91 is rotated by 60 degrees, relative to the first layer 90, which means that the two walls, which were present on two walls of the hexagon, now lie on top of a flexible wall (98*b*, 98*e* of FIG. 6*a*), so that the structural layer of the second layer 91 now abuts a flexible layer in the longitudinal direction of the wall (axis A in FIG. 1).

The next layer, i.e. the third layer 92, as shown in FIG. 6*c*, is then produced, in such a way that the structure of the layer 92 is rotated by 60 degrees (α), relative to the second layer 90 (120 degrees rotation relative to the first layer 90), which means that the two walls 98*a*, 98*a*', which were present on two walls of the hexagon, now lie on top of a flexible wall (98*c*-98*e* of FIG. 6*a*), so that the structural layer of the second layer 91 now abuts a flexible layer in the longitudinal direction of the wall (axis A in FIG. 1).

Thus, by adding layers on top of each other and rotating the layers a certain degree, it is possible to construct a hexagonal cell, where the walls of the hexagonal shape have a structure as shown in e.g. FIG. 1*a*, where the wall has a primary structural layer, and a first and a second flexible layers in the direction of the axis A. The axis A may be seen as an axis that is a normal to the two dimensional plane shown in FIG. 6*a*-6*c*, where the longitudinal axis of the wall rises up from the plane of the drawings towards the reader.

Figure 7A:
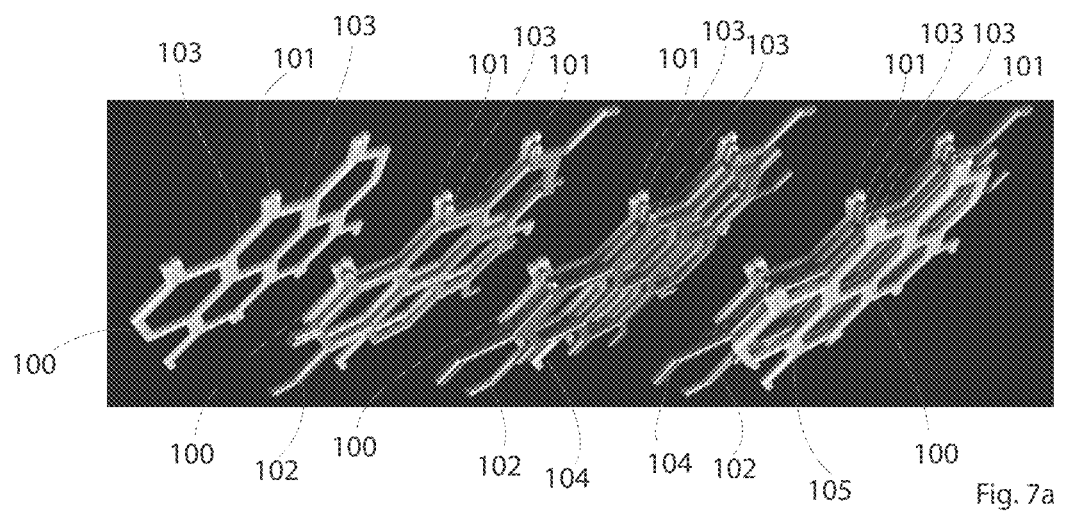
FIGS. 7a and 7b shows a perspective view of a layered structure in different steps.
Figure 7B:
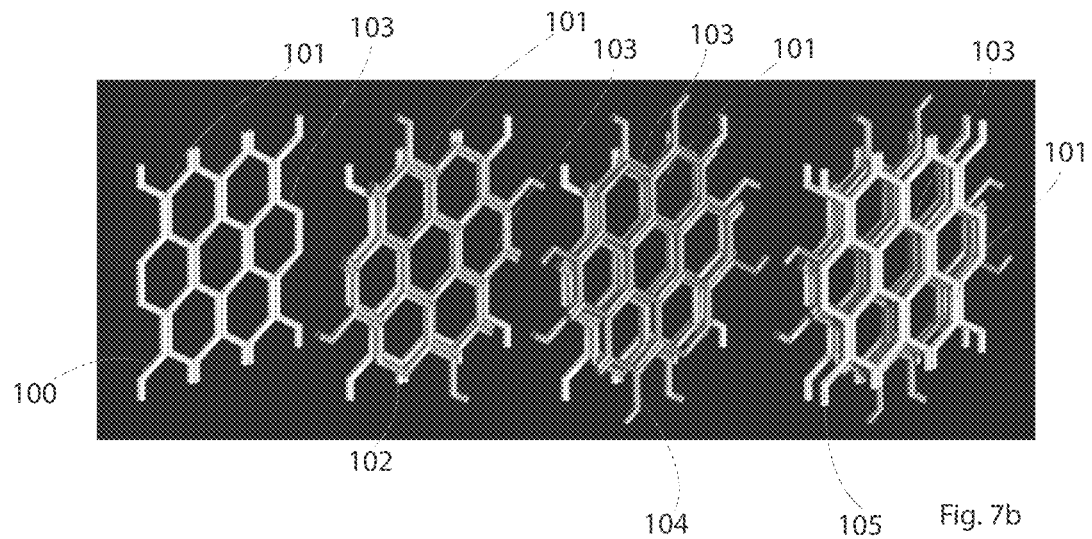

FIGS. 7*a* and 7*b* show a perspective view of the process disclosed in FIG. 6*a*-6*c*, where the leftmost structure shows a first layer 100 of 3D printed structure, where the double wall 101 has a first angle, and has two neighbouring single walls 103. In the second structure from the left, a second layer 102 has been positioned on top of the first layer 101, where the double wall 101 now abuts a single wall 103 by rotating the structure of the layer 60 degrees, and where a single wall 103 now is positioned on top of the double wall in the first layer. The third structure from the left shows where a third layer 104 has been positioned on top of the second layer 102, where the double wall now is positioned on top of a single wall 103 of the second layer 102, and a single wall 103 of the third layer has been positioned on top of the double layer 101 of the second layer. The fourth structure from the left now shows how a fourth layer 105 having a structure that is somewhat identical to the first layer is positioned on top of the third layer, so that a double wall 101 is positioned on top of a single wall 103, and a single wall 103 of the fourth layer is positioned on top of a double wall 101 in the third layer.

By the provision of the layers on top of each other in the manner as shown in FIG. 1 by rotating the double wall in each height, it is possible to construct a wall as shown in FIG. 1-FIG. 5, where a structural layer (double wall) is followed by a flexible layer (single wall). The rotation may be done in a different manner, where each layer may be provided in different rotation and structure, so that the desired structure of a wall may be obtained. Furthermore, the rotation of the layers may be done differently, when the cells have a different shape, i.e. for a triangular shape of a cell, the rotation may be a product of about 120 degrees, for a rectangular shape, the rotation may be e.g. a product of 90 degrees, to obtain a certain structure. If the shape of the cells is circular, any angle may be utilized for rotation, to obtain a structure. Thus, the rotation of the layers may be adjusted in view of the shape of the cells or the walled structure of the 3D printed structure.

Figure 8:
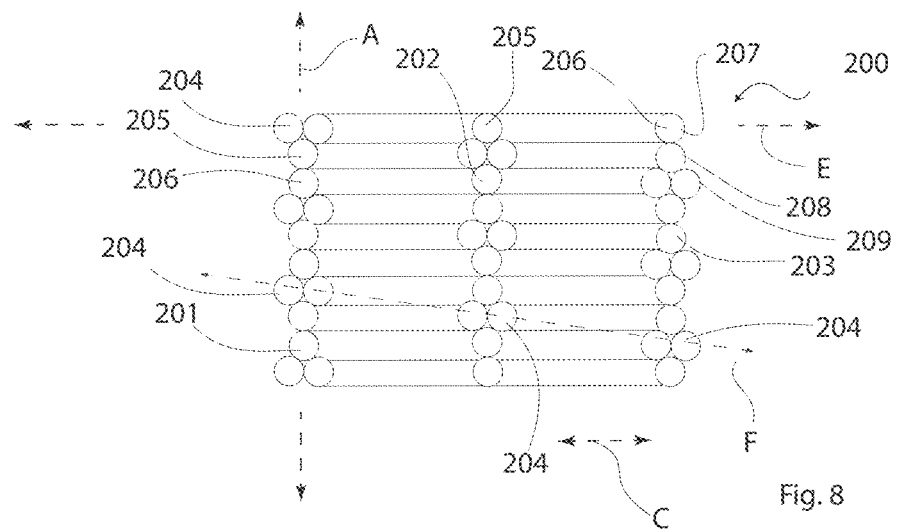
FIG. 8 shows a sectional view of a part of a 3D printed structure.

FIG. 8 shows a schematic cross-sectional view of a structure of a cell 200, showing three adjacent walls 201, 202, 203, that are attached to each other in the direction C. Each wall has a structural layer 204, followed by two flexible layers 205, 206, in a repeating pattern in the direction of the axis A. In other embodiments, any of the walls shown in the previous embodiments may be utilized, in order to obtain a certain pattern, structure of walls, as well as adjacent walls. In one embodiment, the pattern of adjacent walls may be any suitable pattern, where e.g. the pattern of structural and flexible layers shown in in FIG. 1a, may be provided in one wall, where the adjacent wall may have a pattern as e.g. shown in FIGS. 1b, 1c, or FIG. 4. Thus, there is no requirement of a specific pattern of walls, and this pattern can be adjusted for a specific application, where one wall has a first rigidity followed by another wall having another flexibility, that may be higher or lower than the first wall.

When viewing the 3D printed structure in FIG. 8 in the direction of axis C, it is possible to see that each layer of material of the structure has, having a second axis E, has at least one structural layer 204 and a first 205 and a second flexible layer 206. Thus, the 3D printed structure may in one layer may define a layer of a wall, where one of the walls may have a structural layer having a higher rigidity while the two adjacent walls may have, or on each side of the structural wall, may have a flexible wall.

Furthermore, when viewing the structure of FIG. 8, it is also possible to see that the structure of the structural walls may be seen as having a diagonal pattern, along the axis F, as shown in FIG. 8. When moving in a direction C it may be seen that the structural layer is replaced by a flexible layer 205, and the next structural layer 204 to the side, i.e. in the adjacent wall 202 is one layer lower than the first structural layer 204 of the first wall 201. The same may be stated in view of the third wall 203 in the structural layer 204 is one layer lower than the previous structural layer 204 in the second wall 202. Thus, seen in three dimensions, the structural layers 204 follow a helical axis, where an adjacent wall has a structural layer a layer lower than the previous wall.

In this embodiment a structural layer 204 abuts a flexible layer in the direction of axis A, and may also abut a flexible layer in the direction of axis E. Thus, a structural layer 204 in the first layer 207 of the 3D printed structure 200 may have a flexible layer 205 that abuts the structural layer 204 in the second layer 208 of the 3D printed structure 200. Furthermore, the second wall 202 may be provided with a flexible layer 205, which abuts the structural layer 204 in the first layer 208. Yet further, the third wall 203 may further be provided with a flexible layer 205, which abuts the flexible layer 205 in the first layer 208 in the direction of the axis E.

The third layer 209 may yet further be provided with a flexible layer 205 or a structural layer 204 in the direction of axis A, abutting a flexible layer 205 or a structural layer 204 in the previous layer 208.

The walls of the embodiment shown in FIG. 8 may be seen as having a third axis F, where the third axis may be seen as following the walls of the cells (as seen in FIGS. 7a and 7b in a helical manner. Thus, the helical axis F may extend diagonally downwards, where the axis F intersects a structural layer 204, in each wall. The view shown in FIG. 8 is distorted, as the view is seen from the side in two dimensions. The helical axis may be seen as a curve in three dimensional space, and may be similar in shape to a coiled spring, or similar to a handrail in a spiral staircase, where the helical axis moves downwards in a "screwing" motion, in the shape of e.g. a cylindrical helix.

In accordance with the present disclosure, the exemplary embodiments of one, two or three walls of the 3D printed structure is to be understood as being combinable. I.e. in a figure showing one wall, the same wall may be utilized as a second, third or any subsequent wall or wall part in accordance with the description. The person skilled in the art will not have any problem in combining disclosures of one embodiment with another embodiment based on the present description of the 3D printed structure.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

What is claimed is:

1. A 3D printed structure of an elastic material, the 3D printed structure comprising:
   a wall configured to deform when a force is applied to the wall in a direction of an axis and configured to return to an original form of the wall when the applied force is released,
   wherein the wall has a plurality of layers extending along the axis, the wall comprising a primary structural layer, a first flexible layer, and a second flexible layer,
   wherein the primary structural layer has a first rigidity and at least one of the first flexible layer or the second flexible layer has a second rigidity, wherein the first rigidity is greater than the second rigidity, and
   wherein the elastic material is stretchable or compressible without plastic deformation.

2. The 3D printed structure according to claim 1, wherein the primary structural layer abuts the first flexible layer and the second flexible layer along the axis.

3. The 3D printed structure according to claim 1, wherein the primary structural layer and the at least one of the first flexible layer or the second flexible layer are configured to have the first rigidity and the second rigidity, respectively, in a longitudinal direction.

4. The 3D printed structure according to claim 1, wherein the primary structural layer and the at least one of the first flexible layer or the second flexible layer are configured to have the first rigidity and the second rigidity, respectively, in a transverse direction.

5. The 3D printed structure according to claim 1, wherein the primary structural layer and the at least one of the first flexible layer or the second flexible layer are configured to have the first rigidity and the second rigidity, respectively, in a rotational direction.

6. The 3D printed structure according to claim 1, wherein a width of the primary structural layer is larger than a width of the at least one of the first flexible layer or the second flexible layer.

7. The 3D printed structure according to claim 1, wherein the wall further comprises at least one of a secondary structural layer or a third flexible layer.

8. The 3D printed structure according to claim 1, wherein the wall has a repeating layered structure along a longitudinal axis of at least one of the primary structural layer, the first flexible layer, or the second flexible layer.

9. The 3D printed structure according to claim 7, wherein the wall includes the secondary structural layer, and
wherein the primary structural layer and the secondary structural layer are separated by at least the first flexible layer.

10. The 3D printed structure according to claim 1, wherein the height of the primary structural layer is substantially similar to the height of the at least one of the first flexible layer or the second flexible layer.

11. The 3D printed structure according to claim 1, wherein the primary structural layer is separated in a longitudinal direction by two or more flexible layers.

12. The 3D printed structure according to claim 1, wherein the wall has a height extending between a first end of the wall and a second end of the wall, and
wherein the primary structural layer is positioned a distance of at least 20% of the height from the first end of the wall.

13. The 3D printed structure according to claim 1, wherein the axis intersects a central axis of the primary structural layer.

14. The 3D printed structure according to claim 1, wherein the elastic material is a silicone material or a mixture of a silicone material.

15. The 3D printed structure according to claim 1, wherein the primary structural layer is made from a first material composition and the at least one of the first flexible layer or the second flexible layer is made from a second material composition, wherein the first material composition is different from the second material composition.

16. The 3D printed structure according to claim 1, wherein the wall has a height extending between a first end of the wall and a second end of the wall, and
wherein the primary structural layer is positioned a distance of at least 20% of the height from the second end of the wall.

17. The 3D printed structure according to claim 1, wherein the axis intersects a central axis of the at least one of the first flexible layer or the second flexible layer.

18. A 3D printed structure of an elastic material, the 3D printed structure comprising:
a plurality of intersecting walls, each wall including:
a primary structural layer,
a first flexible layer connected to the primary structural layer, and
a second flexible layer connected to the first flexible layer, the wall being elastically deformable such that, upon application of a force to the wall in a direction that extends through a height of the wall, the wall elastically deforms and returns to an original state upon removal of the force from the wall,
wherein the primary structural layer has a first width, and
wherein the first flexible layer and the second flexible layer have a second width that is less than the first width.

* * * * *